United States Patent

Cassinelli et al.

[15] 3,696,194

[45] Oct. 3, 1972

[54] ANTIBIOTIC SUBSTANCE LIBANOMYCIN

[72] Inventors: Giuseppe Cassinelli, Rivanazzo; Ernesto Cotta, Milan; Paolo Pennella, Milan; Remo Faustini, Milan, all of Italy

[73] Assignee: Societa Farmaceutical Italian, Milan, Italy

[22] Filed: Jan. 9, 1970

[21] Appl. No.: 1,619

Related U.S. Application Data

[63] Continuation-in-part of Ser. No. 723,565, Apr. 23, 1968.

[30] Foreign Application Priority Data

April 28, 1967 Italy.....................15470 A/67

[52] U.S. Cl. ..................424/115, 195/80, 424/122
[51] Int. Cl. ............................................A61k 21/00
[58] Field of Search ................424/122, 115; 195/80

[56] References Cited

OTHER PUBLICATIONS

Derwent Farmdoc 34,783, Abstracting BE 714,243, Published Oct. 25, 1968.

*Primary Examiner*—Jerome D. Goldberg
*Attorney*—Curt M. Avery, Arthur E. Wilfond, Herbert L. Lerner and Daniel J. Tick

[57] ABSTRACT

Described are the new antibiotic substance libanomycin, consisting of libanomycin A, libanomycin B and libanomycin C, and a process for the preparation thereof. The process is characterized in that a new microorganism of the species *Streptomyces libani* n.sp. is grown under aerobic conditions in a liquid cultural medium containing a source of carbon, of nitrogen and mineral salts, at a temperature of from 22° to 37° C, for a period of from 72 to 160 hours, at a pH of from 5 to 8.8. The antibiotic complex libanomycin thus obtained is isolated from the fermentation broth by extraction with suitable solvents and precipitation therefrom. The antibiotic complex may be separated in the three forms libanomycin A, libanomycin B and libanomycin C by column chromatography. The microorganisms used in the process have been designated as *Streptomyces libani* n. sp. F.I. 2343, *Streptomyces libani* n.sp. F.I. 2399, *Streptomyces libani* n.sp. F.I. 2501, *Streptomyces libani* n.sp. F.I. 2521 and have been deposited at the Institute of Microbiology of the Rutger University receiving the index numbers I.M.R.U. 3915, I.M.R.U. 3916, I.M.R.U. 3917, I.M.R.U. 3918.

6 Claims, 3 Drawing Figures

FIGURE 1: —— CH₃OH
--- Na OH 0,1N in CH₃OH
······ HCl 0,1N in CH₃OH

ANTIBIOTIC SUBSTANCE LIBANOMYCIN

The present application is a continuation-in-part of application Ser. No. 723,565, filed April 23, 1968, which application stands abandoned.

Our invention relates to a new antibiotic substance and to the process for its preparation.

More particularly, the object of the present invention is a new antibiotic substance which we call "libanomycin" and is constituted by a complex including three substances: libanomycin A, libanomycin B and libanomycin C. These have been isolated and characterized as will be described. A further object of our invention is the process for preparing the antibiotic libanomycin by one of the microorganisms belonging to the new species *Streptomyces libani*.

The microorganisms used in the process of the invention have been designated as *Streptomyces libani* n.sp. F.I. 2343,*Streptomyces libani* n.sp. F.I. 2399, *Streptomyces libani* n.sp. F.I. 2501, and *Streptomyces libani* n.sp. F.I. 2521 and have been deposited at the Institute of Microbiology of the Rutger University (U.S.A.) respectively receiving the index numbers I.M.R.U. 3915, I.M.R.U. 3916, I.M.R.U. 3917 and I.M.R.U. 3918, at the Commonwealth Mycological Institute, Ferry Lane, Kew, Surrey (Great Britain) respectively receiving the index numbers I.M.I. 13077, I.M.I. 130778; I.M.I. 130779 and I.M.I. 131233 and at the Institute of Plant Pathology of the University of Milan (Italy) respectively receiving the index numbers I.P.V. 1945, I.P.V. 1943, I.P.V. 1942 and I.P.V. 1944. It has been freely available, i.e. without reservation from the depositor, at the University of Milan since April 6, 1968. Particularly, it has been found that these microorganisms in a liquid, submerged and shaken culture produce the antibiotic of the present invention. The antibiotic has proved active on gram positive and acid-resistant bacteria, on fungi and as a growth factor.

The strain F.I. 2343 has been isolated from a soil sample collected at Biblos (Libanus); the strain F.I. 2399 has been isolated from a soil sample in a rice-field in Piedmont; the strain F.I. 2501 from a soil sample collected at San Jeronimo Del Sauce (Argentine) and finally the strain F.I. 2521 from a soil sample collected at Nieder Beerbach-Sexheim (West Germany).

These microorganisms show the following morphological, cultural and biochemical characteristics. The morphological characteristics are common to all the strains while the cultural characteristics vary from one strain to another.

Morphological Properties

On the usual culture media, the vegetative mycelium is formed by more or less thin, 0.4-0.8 $\mu$ thick, long and abundantly branched hyphae.

These form thicker hyphae, 1-1.5 $\mu$ thick, from normally long to very long, on which short, lateral and tightly spiralled small branches are inserted oppositely or alternatively by monopodially branching. These small branches when completely grown, transform into chains of spores which are first bound, then free. Under the electron microscope, the spores show a smooth surface of oval shape or typically reniform, sometimes also spherical. The sizes are very variable: 1.2-1.6 $\mu$ by 1.2-2.4 $\mu$.

Cultural and Biochemical Properties

Table 1 gives the cultural properties of the individual microorganisms under examination, as they have been noted on the indicated media, growing the strains at 28° C in test tubes and on Petri dishes and carrying out the observations 6, 15 and 25 days after inoculation. The cultural properties, as can be seen from Table 1, vary slightly from one strain to another according to the development substrate; that is, the aerial mycelium may be rather smooth in the strains F.I. 2343 and sometimes F.I. 2501, while cottony for the formation of sporophore hyphae, very long, in the strains F.I. 2399 and F.I. 2521. Likewise, the color of the aerial mycelium which is white for all the strains on some organic media, is prevalently hazel-brown on others and on the synthetic ones. On these, however, strains F.I. 2399 and F.I. 2521 can show also weak gray shades.

The strain F.I. 2501 differs from the other three in the production of a soluble rose-wine like pigment, the color of which, to a certain extent, also influences that of the vegetative mycelium and consequently the color of the aerial mycelium. Moreover, the strain F.I. 2501 differs from the other three because it utilizes 1-arabinose and does not fluidify gelatine.

The strains under examination do not reduce nitrates to nitrites, produce neither melanine, nor hydrogen sulphide; they hydrolyze starch, fluidify gelatine and utilize tyrosine; the strains F.I. 2343 and F.I. 2521 peptonize and coagulate milk; the strains F.I. 2399 and F.I. 2501 coagulate milk without peptonizing it.

Glucose, saccharose, d-xylose, mesoinositol, d-mannose, d-fructose, maltose and raffinose are utilized for the growth, while ramnose and 1-arabinose are not utilized by any but the strain F.I. 2501 as stated above.

The microorganisms do not grow at 50° C and do not produce sclerotia; in submerged and shaken culture, they produce the antibiotic libanomycin.

1. Waksman S.A. (The Actinomycetes, Vol. II (1961) pages 328-334).
2. Pridham T.G. et al. (Antibiotics Annual 1956-1957, p. 947-953).
3. Baldacci E. et al. (Giorn. Microbiol.) 9, 1961, p. 39.
4. 200 g of boiled potatoes are filtered through gauze and 20 g of glucose and 20 g of agar are added. It is then taken up to 1 liter and sterilized at 120° C, for 20 minutes.

Identification of the Strains

The properties shown by the microorganisms under examination and previously described relate them to the genus Streptomyces Waksman et Henrici (Bargey's Manual of Determinative Bacteriology, 7th Ed. 1957, p. 744-745).

The strains under examination belong to the section "Spira" of Pridham et al. (Appl. Microbiol. 6, 1958, p. 52) but they are not referable to any of the series and therefore of the species enumerated therein.

In fact, in this taxon, a series including a species with a brown aerial mycelium is not seen. This color is a characteristic of the strains F.I. 2343, F.I. 2399, F.I. 2501 and F.I. 2521. These microorganisms cannot be related to any of the systematic groups (taxa) suggested by Waksman (The Actinomycetes, 1961, vol.II, p. 111 and 117) and to any of the groups suggested by Baldacci (Giorn. Microbiol., 6, 1958, p. 10) because, in these taxa, series or groups having yellow colored vegetative mycelium and brown colored aerial mycelium are ab- TABLE 1 – Cultural Properties of the Strains F.I. 2343, F.I. 2399, F.I. 2501 and F.I. 2521

| Medium | Properties | Strain FI 2343 | Strain FI 2399 | Strain FI 2501 | Strain FI 2521 |
|---|---|---|---|---|---|
| Bennet's agar (1) | growth veget. mycelium {front side / back side} aerial mycelium soluble pigment | abundant patina lemon yellow lemon yellow-ochre white-hazel brown absent | abundant patina straw-lemon lemon yellow-ochre hazel brown-gray absent | abundant patina straw-lemon lemon yellow-vinaceous chocolate-brown vinaceous | abundant patina straw-lemon lemon light-ochre white-brown-gray absent |
| Czapek's agar (1) | growth veget. mycelium {front side / back side} aerial mycelium soluble pigment | fair patina colorless straw lemon smooth, white absent | fair patina straw colored straw colored cottony, cream-white absent | fair patina colorless vinaceous hazel-brown chocolate vinaceous | fair patina straw colored straw colored white-beige-gray absent |
| Asparagine glucose agar (1) | growth veget. mycelium {front side / back side} aerial mycelium soluble pigment | fair patina colorless straw lemon white-white hazel absent | fair patina straw colored cottony, chamois-brown absent | fair patina colorless vinaceous smooth, vinaceous-brown vinaceous | fair patina colorless straw colored cottony, gray-brown absent |
| Glycerol glycine agar (1) | growth veget. mycelium {front side / back side} aerial mycelium soluble pigment | abundant patina orange yellow orange white-light brown absent | abundant patina lemon-orange orange light gray, cottony white absent | abundant patina straw colored-light green vinaceous gray-brown, cottony vinaceous | abundant patina orange orange cottony, light gray absent |
| Emerson's agar (1) | growth veget. mycelium {front side / back side} aerial mycelium soluble pigment | abundant patina ochre-yellow deep ochre smooth, white absent | abundant patina ochre-yellow deep ochre smooth, white absent | abundant patina ochre-yellow deep ochre smooth, white absent | abundant patina ochre-yellow deep ochre smooth, white absent |

TABLE 1 – continued

| | | | | | |
|---|---|---|---|---|---|
| Starch salts and agar (2) | growth veget. mycelium {front side / back side} | abundant patina straw yellow / lemon yellow | abundant patina straw colored-light green / straw colored-light green | abundant patina vinaceous-ochre / vinaceous-brown | abundant patina colorless / straw yellow |
| | aerial mycelium | chamois brown | cottony-chamois-brown | smooth, hazel brown | cottony, hazel brown |
| | soluble pigment | absent | absent | vinaceous | absent |
| Agar potato (4) | growth veget. mycelium {front side / back side} | abundant patina lemon yellow / ochre yellow | abundant patina lemon yellow / deep lemon yellow | abundant patina vinaceous-brown / vinaceous-brown | abundant patina lemon yellow / deep lemon yellow |
| | aerial mycelium | whitish-brown-hazel | brown-light gray | deep hazel brown | whitish-brown-chamois |
| | soluble pigment | absent | absent | vinaceous | absent |
| Oats agar (3) | growth veget. mycelium {front side / back side} | abundant patina straw yellow / lemon yellow | abundant patina straw colored / colorless | abundant patina straw colored vinaceous / brown-vinaceous | abundant patina colorless / straw colored |
| | aerial mycelium | smooth, hazel brown | cottony, chamois brown | beige, chamois brown | gray-light brown |
| | soluble pigment | absent | absent | chestnut brown | absent |
| Glycerol-asparagine agar (1) | growth veget. mycelium {front side / back side} | abundant patina straw yellow / straw yellow | abundant patina straw colored / straw lemon | abundant patina pink-vinaceous / vinaceous brown-vinaceous | abundant patina straw colored yellow lemon |
| | aerial mycelium | whitish-brown chamois | cottony, chamois brown | vinaceous | cottony, gray brown |
| | soluble pigment | absent | absent | vinaceous | absent |
| Yeast extract-glucose agar (1) | growth veget. mycelium {front side / back side} | abundant patina ochre yellow / ochre yellow | abundant patina ochre yellow / ochre yellow | abundant patina lemon yellow / ochre yellow | abundant patina lemon yellow / ochre yellow |
| | aerial mycelium | chamois brown | white with brown shades | hazel brown | gray brown |
| | soluble pigment | absent | absent | absent | absent | sent. For the same reasons they can be related neither to the systematic groups suggested by Flaig and Kutzner (Arch. Mikrobiol. 35, 1960, p. 105–138), nor to the species described by Krassilnikov (Guide to the identification of Bacteria and Actinomycetes 1949, Moscow).

We conclude that the microorganisms under examination have to be considered as belonging to a new species for which we suggest the name of *Streptomyces libani* n.sp. The strain F.I.2501 is considered because of the above differences, a variety of the mentioned species for which we suggest the name of *Streptomyces libani*, var. *rufus*.

The microorganisms are stored as are other cultures on a suitable solid medium, or by lyophilization of their spores suspended in milk.

The microbiologic process for the preparation of the antibiotic libanomycin, according to the invention, consists in fermenting a new microorganism of the species *Streptomyces libani* n.sp. in a cultural medium containing a source of carbon, nitrogen and mineral salts and extraction of the thus obtained antibiotic libanomycin. More particularly, the microorganism is cultured in a liquid cultural medium under aerobic conditions at a temperature between 22° and 37°C, preferably at 28°, over a period of time generally between 72 and 160 hours. The pH may vary, according to the fermentation media employed, and is from 5 to 8.8. As carbon source the following may be used: glucose, dextrin, starch, different meals (soyabean-meal, corn-meal, wheat-meal, etc.) beet molasses, corn steeps, different vegetable oils and other substances of common use.

The nitrogen source, besides the above complex substances containing nitrogen, may be constituted by casein, casein hydrolyzates, distillers soubles and ammonium salts such as ammonium sulphates, phosphates, chloride and other substances of common use. The mineral salts useful for the production of the antibiotic vary according to the medium used. Calcium carbonate is almost always present and the chlorides, sulphates or phosphates of sodium, potassium, magnesium, manganese, iron, zinc and copper may be added.

The fermentation may be carried out in Erlenmeyer flasks or in laboratory and industrial fermenters of various capacity. The complex indicated as libanomycin includes three substances with very similar chemical-physical and biologic properties which are named by us libanomycin A and libanomycin B and libanomycin C. The antibiotic activity in the broths and crude substances is tested on a sensitive microorganism and compared with that of samples containing large quantities of antibiotic.

The quantity present in crude substance is also determined spectrophotometrically in methanol solution on the basis of the adsorption values at 284 m$\mu$.

When the fermentation is over, the antibiotic complex libanomycin which is prevalently present in the mycelium is isolated according to the known usual extraction techniques with suitable solvents, such as aqueous alcohols or aqueous acetone and following precipitation. The crude precipitate obtained, consisting of the antibiotic complex, may be purified and isolated in the three forms libanomycin A, B and C through column chromatography. More particularly, an extraction and purification process may be carried out as follows. The mycelium is extracted with an alcohol or with aqueous acetone. Upon concentration of the extracts to small volume, a crude compound precipitates. This is washed with water, dried on calcium chloride and then washed with anhydrous acetone. The supernatant and the aqueous washings of the crude product obtained from the mycelium extract are added to the filtered broth. The active product may be extracted from the above broth with butyl alcohol at 7.5–8.5 pH or through adsorption on carboxylic cationic exchange resin in acid form.

From the butanolic extracts, washed with water and concentrated to small volume, the active crude products are obtained by precipitation with acetone or ethyl ether. During the process with resin, after adsorbing and washing the resin with water and 0.5 N ammonium hydroxide, the active product may be eluted with aqueous alcoholic saline solutions, for example with 3 percent methyl alcohol : sodium chloride (3:1). The antibiotic complex is obtained from the active eluates concentrated by extraction with butylic alcohol at 7.5–8.5 pH and precipitation of the extract with acetone.

The crude product, which is so obtained (at 50–70 percent), is dissolved in an alcohol at low molecular weight, and the solution is chromatographed on a column of neutral activated alumina or silica gel.

Upon alcoholic elution, the fraction B is first obtained, then the fractions A and C. The 90–95 percent antibiotics are obtained from the eluates, in the form of white amorphous powder. Analytic samples of the antibiotics have been obtained after a further chromatography on column of powder of cellulose using as the eluent the mixture butanol : pyridine : water (6:4:3).

Figure 1:
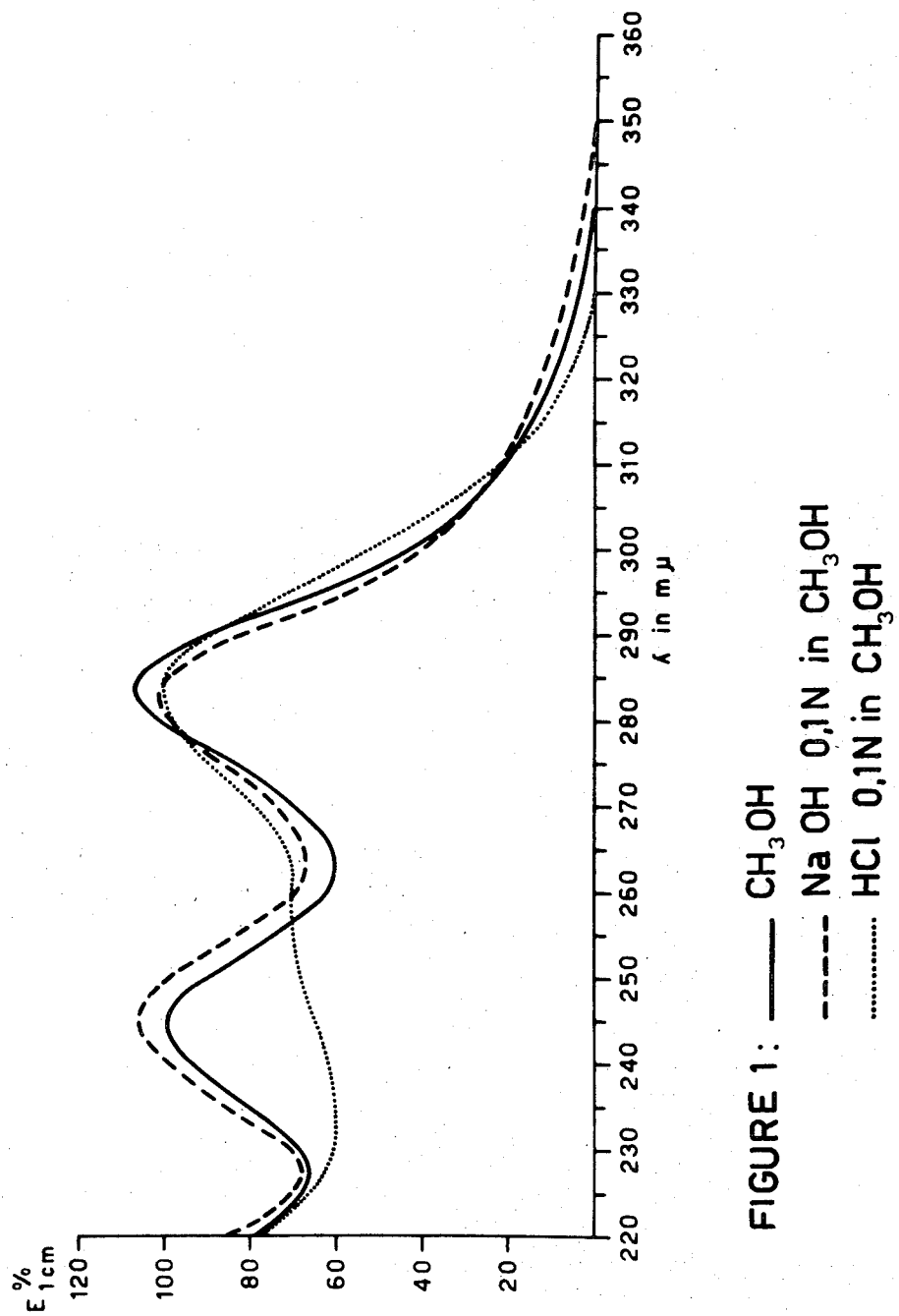
FIG. 1 shows the UV adsorption spectrum of libanomycin A.

Libanomycin A is an amorphous powder which melts at 152°–154° C (by decomposition); $[\alpha]_D^{25} = +62.5°$ ($c = 1$ in methanol). The ultraviolet (UV) adsorption spectrum is shown in FIG. 1 and shows the following properties:

$\lambda_{max.}^{CH_3OH}$ 244 and 284 m$\mu$($E_{1\,cm}^{1\%}$ = 100.107);

$\lambda_{max.}^{NaOH\,0.1\,N\,in\,CH_3OH}$ 245 and 283 m$\mu$($E_{1\,cm}^{1\%}$ = 100.102);

$\lambda_{max.}^{HCl\,0.1\,N\,in\,CH_3OH}$ 284 m$\mu$($E_{1\,cm}^{1\%}$ = 101) and flexion at 255 m$\mu$ ($E_{1\,cm}^{1\%}$ = 70);

Its centesimal composition is:

C = 63.23%, H = 7.94%, N = 6.5% giving an empirical formula $C_{34}H_{51}N_3O_9$, with a molecular weight 686. Reactions: $FeCl_3$, $KMnO_4$, $Br_2$ positive.

With concentrated sulphuric acid it gives a blue color which then turns to violet. Fehling, ninidrine and Sakaguchi reactions are negative. On chromatographic paper it is revealed with the reagents of Burton for the phenols and enols (Nature, 170, p. 249, 1952), Pan-Dutcher for the amides (Anal. Chem. 28, p. 836, 1956) and Ehrlich (yellow coloring).

Figure 2:
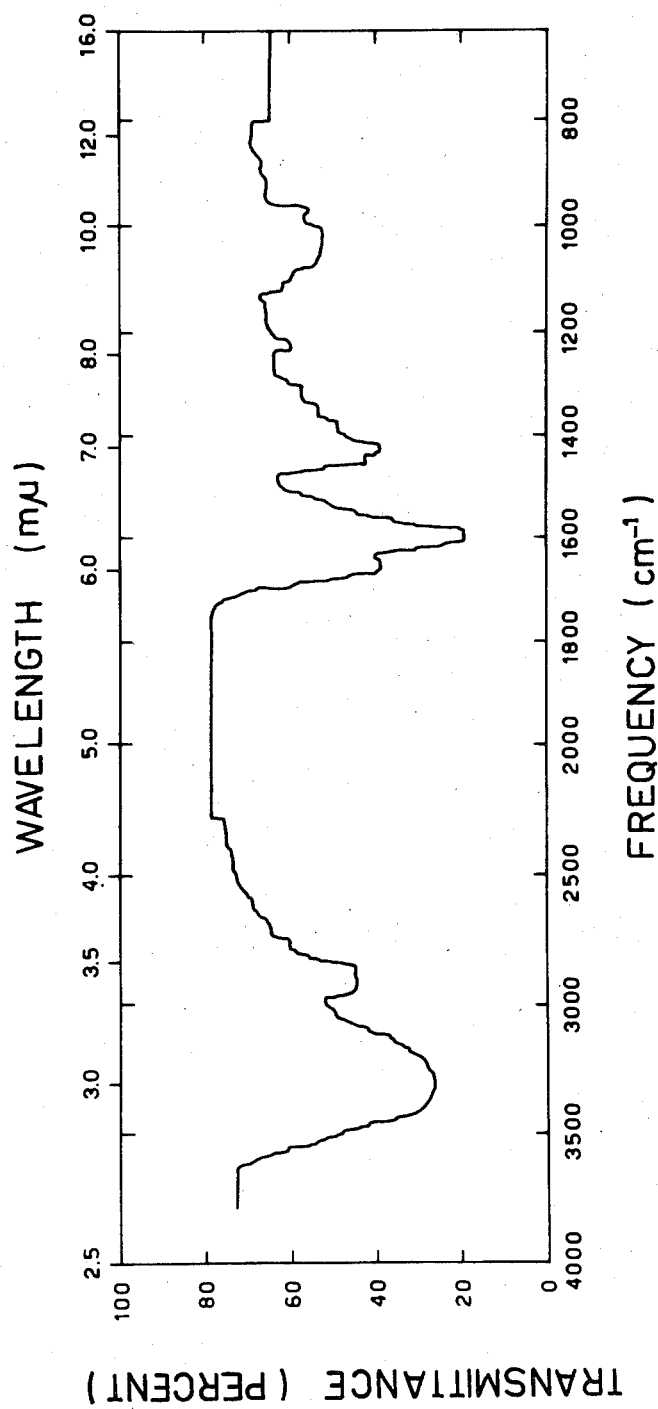
FIG. 2 shows the IR adsorption spectrum of libanomycin A.

Libanomycin A is very soluble in aqueous alcohols, aqueous acetone, pyridine, dimethylformamide and dimethylsulphoxide; soluble in methyl alcohol (20 mg/cc) and ethyl alcohol (4.5 mg/cc), slightly soluble in water (1 mg/cc at 20° C and 5 mg/cc at 50° C) and insoluble in acetone, chloroform, benzene, ethyl ether and petroleum ether. The product is quickly activated in acids, stable to neutral or slightly alkaline pH, to light and to room temperature. The infrared (IR) adsorption spectrum is shown in FIG. 2.

Libanomycin B is a white amorphous powder melting at 155°–160° C (with decomposition); $[a]_D^{23} = +72°$ ($c$ = 1 methanol). Its centesimal composition is: C = 64.16%, H = 8.32%, N = 6.80%, giving an empirical formula $C_{33}H_{51}N_3O_8$.

Figure 3:
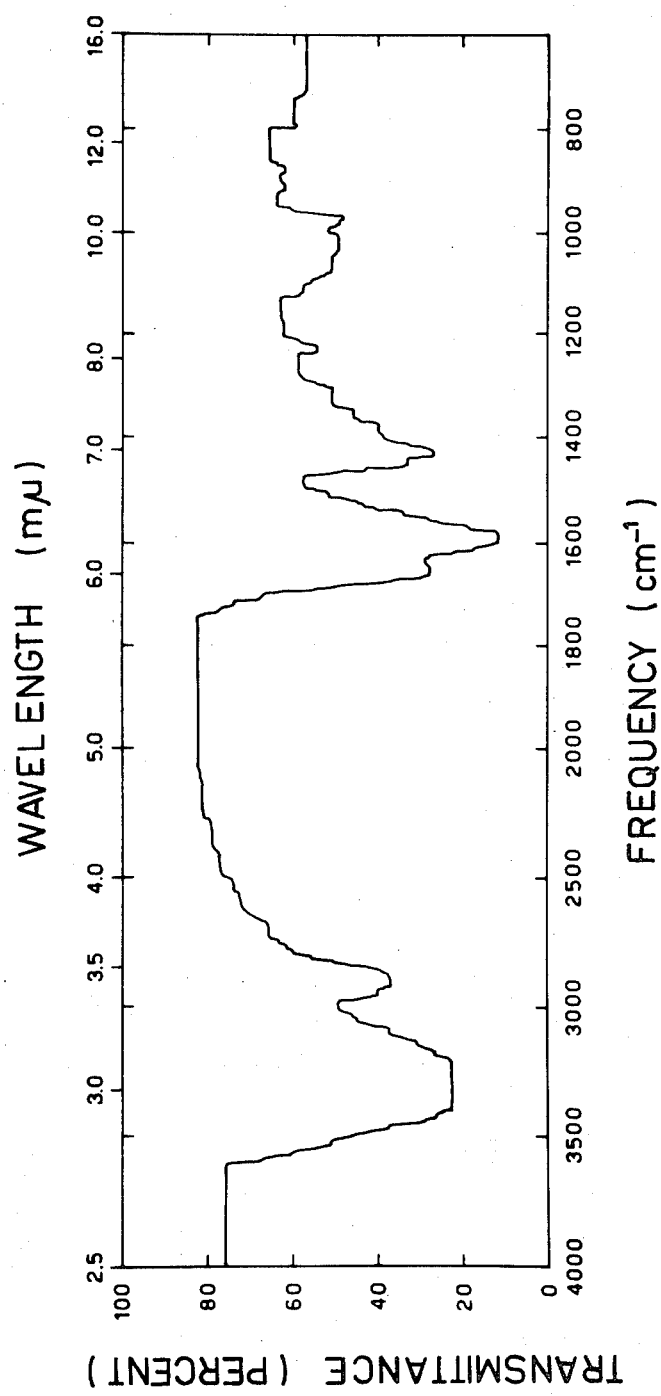
FIG. 3 shows the IR adsorption spectrum of libanomycin B.

The ultraviolet spectrum and the other chemical-physical properties are common to those of the libanomycin A, except for the solubility in ethyl alcohol where libanomycin B is more soluble than libanomycin A (10 mg/cc). The infrared adsorption spectrum of libanomycin B is shown in FIG. 3. Libanomycin C also shows the same ultraviolet spectrum of FIG. 1 and shows the same infrared spectrum of libanomycin A. By paper chromatography at room temperature, the antibiotics are revealed by bio-autography on *B.subtilis*.

| Solvent | | Libanomycin A | B | C |
|---|---|---|---|---|
| 1. Butanol:pyridine:water (6:4:3) | Rf | 0.65 | 0.78 | 0.40 |
| 2. Butanol saturated with buffer phosphates M/15 at pH 3, on paper buffered with the same buffer | Rf | 0.60 | 0.85 | — |
| 3. Solvent as in 2 with buffer at pH 5.4 | Rf | 0.55 | 0.75 | — |
| 4. Solvent as in 2 with buffer at pH 7 | Rf | 0.90 | 0.90 | — |
| 5. Solvent as in 2 with buffer at pH 8 | Rf | 0.50 | 0.75 | 0.30 |

The antibiotic substance of the present invention, either in the form of libanomycin-complex or in the form of one of its components libanomycin A, libanomycin B and libanomycin C, shows a high activity on the gram-positive and acid-resistant bacteria, on fungi and as growth factor so as to be employed in human and veterinary fields.

The pharmaceutic compositions containing one of said antibiotics may be prepared, according to the known techniques, in mixture with excipients suitable to the oral or parenteral administration.

The pharmaceutic preparations may be: tablets, sugar-coated pills, powders, pills, syrups. In the veterinary field, the antibiotic substance as such or the mycelium which contains it, is preferably added to the diet usually given to the animals.

Pharmacology

The following tables show the microbiologic activities of the complex libanomycin, which is the preferred manner of usage, i.e., as the complex.

TABLE 2

Spectrum of antibiotic activity (solution 1000 μg/cc) on solid medium. The values show the diameters of the inhibition haloes in mm.

| | |
|---|---|
| S. aureus | 16 |
| B. subtilis | 20 |
| E. coli | 0 |
| P. vulgaris | 0 |
| Mycobacterium sp. strain 607 | 15 |
| Mycobacterium phlei | 17 |
| Candida albicans | 17 |

TABLE 3

Spectrum of activity on solid medium with antibiotic-resistant strains. Solution is at 100 μg/cc and 1000 μg/cc. The values of the diameters of the inhibition haloes are in mm.

| | 1000 μg/cc | 100 μg/cc |
|---|---|---|
| S. aureus | 16 | 13 |
| S. aureus streptomycin-resistant | 16 | 12 |
| S. aureus gramycidin-resistant | 18 | 13 |
| S. aureus viomycine-resistant | 17 | 13 |
| S. aureus polymixine-resistant | 17 | 13 |
| S. aureus neomycin-resistant | 15 | 10 |
| S. aureus griseomycin-resistant | 15 | 10 |
| S. aureus sequamycin-resistant | 16 | 12 |
| S. aureus cathomycin-resistant | 16 | 12 |
| S. aureus oxamycin-resistant | 14 | 10 |
| S. aureus ilotycin-resistant | 17 | 13 |
| S. aureus cephalosporine-resistant | 18 | 15 |

TABLE 4

Antibiotic activity in liquid medium

| | Medium | DIM (μg/cc) |
|---|---|---|
| S. lutea | meat broth | 5 |
| B. subtilis | meat broth | 5 |
| Staph. aureus strain 209 P | meat broth | 2.5 |
| Mycobacterium strain 607 | yeast broth | 2.5 |
| Mycobacterium tuberculosis $H_{37}R_v$ | Petragnani | 50 |
| S. faecalis | meat broth | 10 |
| E. coli B | meat broth | >20 |
| Sh. flexneri | meat broth | >20 |
| Proteus vulgaris | meat broth | >20 |
| C. albicans | Sabouraud | >20 |

The toxicity of the libanomycin, expressed as $DL_{50}$ is > 1g/kg by oral route and 25 mg/kg by intravenous route in the mouse. The activity as growth factor of the libanomycin has been determined by an experiment on 180 chickens belonging to the strain H 87, in battery grown, working on separated sexes and using doses of libanomycin of 1 and 2 g/q i.e., grams/ of the mixture. The test began the first day of life and lasted 30 days. The following table shows the treatments effected.

| Group | Treatment | No. subjects | |
|---|---|---|---|
| | | male | female |
| 1 | Basic diet | 30 | 30 |
| 2 | Basic diet + 1 g/q. of libanomycin | 30 | 30 |
| 3 | Basic diet + 2 g/q. of libanomycin | 30 | 30 |

The basic diet used has the following composition:

| | |
|---|---|
| Plata maize | 62.118% |
| 44% Soya meal | 31.200% |

| | |
|---|---|
| Fish meal | 2.000% |
| Dehydrated lucerne | 2.000% |
| Bicalcium phosphate | 0.800% |
| Calcium carbonate | 0.950% |
| Salt | 0.400% |
| Gabbromix P (Registered Trademark) without any antibiotic | 0.500% |
| dl - methionine | 0.032% |

This when analyzed contains:

| | |
|---|---|
| Moisture | 11.78% |
| Crude proteins | 20.75% |
| Crude fats | 3.75% |
| Crude fiber | 2.72% |
| Ashes | 5.07% |
| Crude extracts without nitrogen | 55.93% |
| Calcium | 0.96% |
| Phosphorus | 0.72% |

The weight of the subjects and the food used has been determined on the 30th testing day. The results obtained as weight increase and conversion index are reported in Table 5.

TABLE 5

Male

| Group No. | Weight increase | | Conversion index |
|---|---|---|---|
| | kg | differences % | |
| 1 | 0.492 | — | 1.95 |
| 2 | 0.515 | +4.67 | 1.95 |
| 3 | 0.534 | +8.53 | 1.90 |

Female

| Group No. | Weight increase | | Conversion index |
|---|---|---|---|
| | kg | differences % | |
| 1 | 0.481 | — | 1.96 |
| 2 | 0.511 | +6.23 | 1.93 |
| 3 | 0.510 | +6.02 | 1.93 |

The following examples illustrate the invention without limiting it.

EXAMPLE 1

Two 300 cc flasks have been prepared, each containing 60 cc of the following medium:

| | |
|---|---|
| Dextrin | 3% |
| Casein | 0.5% |
| Corn steep liquor | 0.3% |
| Calcium carbonate | 0.4% |
| Ammonium sulphate | 0.1% |
| Bipotassium phosphate | 0.01% |
| Tap water to complete | |

Sterilization has been carried out by heating to 120° C for 20 minutes. The pH of the medium, after sterilization, varies from 6.8 to 7. Each flask is inoculated with 2 cc of a spore suspension obtained by washing, with 5 cc of distilled water, the patina of a culture in a slant testing tube of 20 days old *Streptomyces F.I.* 2343, grown on potato-glucose-agar. The flasks are incubated at 28° C for 48 hours on a rotary shaker at 225 r.p.m. with a stroke of 3 cm. 2 cc of a culture so grown are used to inoculate other 300 cc flasks containing 60 cc of the following productive medium:

| | |
|---|---|
| Starch | 10% |
| Degreased soya meal | 8% |
| Ammonium sulphate | 0.3% |
| Calcium carbonate | 0.3% |
| Monopotassium phosphate | 0.75% |
| Sodium chloride | 0.25% |
| Magnesium sulphate | 0.1% |
| Zinc sulphate | 0.001% |
| Iron sulphate | 0.001% |
| Copper sulphate | 0.001% |
| Tap water to complete | |

The flasks containing the productive medium are sterilized by heating at 120° C for 20 minutes. The pH is about 5.8 after sterilization. They are then incubated at 28° C under the shaking conditions mentioned above for the vegetative cultures. After 120 hours of incubation, a production of 150 µg/cc is reached. 10 liters of a fermentation broth so obtained are filtered with 2 percent of Supercel (Registered Trade Mark). The mixture is washed with water and the washings are added to the filtered broth. The wet mycelium is first extracted with 3 liters of methyl alcohol, then again with 2 liters of 80 percent aqueous methyl alcohol. The combined extracts are concentrated under reduced pressure to 1/10 (500 cc) of the volume. The precipitate formed is filtered and washed with water and dried overnight under vacuum on calcium chloride at room temperature, and for 4 hours at 56° C on phosphorus anhydride. The yellow-brown powder is suspended in anhydrous acetone, the mixture is filtered and the insoluble fraction is dried.

1.20 g of 70 percent libanomycin complex are thus obtained from the mycelium.

The filtered broth is adjusted to pH 8.5 by addition of 10 percent sodium carbonate, and allowed 1 hour under stirring. The mixture is filtered and the filtrate (11 liter) is extracted twice with 1 volume of butyl alcohol. The extract is washed with water, then concentrated under reduced pressure to 50 cc. Upon adding 10 volumes of acetone, a precipitate is obtained which is then washed with acetone and dried. 0.500 g of 70% active crude product are thus obtained from the filtered broth.

EXAMPLE 2

Operation is as in Example 1, but the productive phase is carried out on the following medium:

| | |
|---|---|
| Dextrin | 4% |
| Casein | 1% |
| Corn steep liquor | 1% |
| Ammonium sulphate | 0.2% |
| Calcium carbonate | 0.5% |
| Bipotassium phosphate | 0.01% |
| Tap water to complete | |

The medium is sterilized by heating at 120° C for 20 minutes. The pH after sterilization varies from 6.7 to 7. It is incubated at 28° C under the shaking conditions described in Example 1. After 120 hours of incubation, a production of 120 µg/cc is obtained.

EXAMPLE 3

The operation is as in Example 1, but the productive phase is carried out on the following medium:

| | |
|---|---|
| Starch | 2% |
| Solubles distillers | 1.75% |
| Sodium chloride | 0.25% |
| Degreased soya meal | 3% |
| Soya oil | 0.8 cc |
| tap water | |
| pH corrected at 7.2 with sodium hydroxide | |
| pH after sterilization about 6.7 | |

The medium is sterilized by heating at 120° C for 20 minutes. It is incubated at 28° C under the shaking conditions described in Example 1. After 120 hours of incubation a production of 100 µg/cc is obtained.

EXAMPLE 4

A 2000 cc flask with three fringed recesses and a side inoculation neck, containing 500 cc of the medium described in Example 1 for the vegetative phase, is sterilized by heating at 120° C for 20 minutes. After cooling, the flask is inoculated with the spore suspension obtained by washing the patina of 3 cultures in testing tube with sterile distilled water. The flask is then incubated at 28° C on rotary shaker at 120 r.p.m. with a stroke of 4.5 cm, for 38 hours. 50 cc of the vegetative culture so obtained are employed for inoculating, in 5 1-glass fermenters, 3 l of a medium composed as follows:

| | |
|---|---|
| Dextrin | 4.0% |
| Casein | 1.0% |
| Corn steep liquor (50%) | 1.0% |
| Calcium carbonate | 0.5% |
| Ammonium sulphate | 0.1% |
| Bipotassium phosphate | 0.1% |
| Tap water to complete | |

The broth is shaken at 400 r.p.m. and aerated with about 1 volume of air per volume of medium per minute, at the temperature of 27° C for about 24 hours. At the end of this period, the 3 l of the mycelium suspension obtained are used to inoculate 50 liters of fermentation medium.

The fermentation medium has the following composition:

| | |
|---|---|
| Starch | 4.0% |
| Casein | 1.0% |
| Soyabeans meal | 3.0% |
| Beet molasses | 0.2% |
| Calcium carbonate | 0.4% |
| Magnesium sulphate | 0.1% |
| Tap water to complete | |

The medium is sterilized at 121° C for 30 minutes and, after inoculation, shaken at 200 r.p.m. and aerated with 0.7 l of air per volume of medium per minute, at 28° C for 110 hours. 110 µg/cc of antibiotic are obtained. 50 l of a fermentation broth so obtained are filtered with 2 percent of Supercel. The wet mycelium is extracted with 15 liters of methyl alcohol and 10 liters of 80% aqueous methyl alcohol. The extracts are concentrated to 4 l, the precipitate formed is filtered and washed with water, dried, suspended in anhydrous acetone, filtered and dried. 11.30 g of 60 percent crude product are thus obtained.

The mother liquors and the aqueous washings are added to the filtered broth, the calcium is eliminated by adjusting the solution (55 l) to pH 6 with sodium hydroxide, and by adding sodium carbonate to pH 9.2.

The mixture is shaken for 1 hour, 100 g of infusorial earth, e.g., Supercel, are added. It is then filtered to eliminate the calcium carbonate. The filtrate is adjusted to pH 6 with hydrogen chloride and the solution is adsorbed on a column containing 2 l of Amberlite IRC 50 (Registered Trade Mark) in hydrochloric phase. When the adsorption of the broth is over, the resin is washed with 5 l of water, 5 l of 0.5 N ammonium hydroxide and with further 5 l of water.

It is eluated with a mixture formed by 3 volumes of methyl alcohol and 1 volume of 3 percent aqueous sodium chloride solution. 6 liters of active eluate are thus obtained. The eluate is concentrated to 1.5 liters under reduced pressure, the pH is adjusted to 8.5 with sodium hydroxide, and is then twice extracted with 1 volume of butyl alcohol. The extract is washed with water, concentrated to 100 cc. Upon adding 10 volumes of acetone, a precipitate is obtained, which is washed and dried to give 3.25 g of 60 percent crude product. 14.20 g of the crude complex are suspended in 200 cc of methyl alcohol, the insoluble inactive fraction (1.40 g) is filtered. The filtrate is adsorbed on a column of 300 g of neutral alumina suspended in methyl alcohol. It is washed with 3 liters of methyl alcohol and is then eluted with 80 percent aqueous methanol. 100 cc fractions of the elution following the spectrophotometrical reading at 244 and 284 mµ are collected. The fractions are analyzed by paper chromatography, using as solvent the mixture butanol:pyridine:water (6:4:3) and revealing the active compounds by bioautography on *B. subtilis*. compounds by bioautography on *B. subtilis*.

The first 20 fractions contain the libanomycin B (Rf 0.78); fractions 21–30 contain a mixture of A and B (Rf 0.65 and Rf 0.78) and fractions 31–50 contain libanomycin A and C (Rf 0.65 and Rf 0.40). Each group of fractions is separately evaporated under vacuum to dryness. The residue is taken up with ethyl alcohol, the solution is filtered, concentrated to small volume and precipitated with 10 volumes of acetone. The precipitates are dried at 56° C on phosphoric anhydride, under vacuum. This yields respectively 1.80 g of libanomycin B (at 90 percent), 1.70 g of libanomycin B + A (at 90 percent) and 3.80 g of libanomycin A + C (at 90 percent).

1.40 g of libanomycin A containing libanomycin B and C are dissolved in 96° ethyl alcohol and the solution is adsorbed on 25 g of cellulose powder. The mixture is dried overnight under vacuum on calcium chloride and then placed into a glass chromatographic column containing 225 g of cellulose powder. It is eluted with the mixture butanol:pyridine:water (6:4:3) and 10 cm³ fractions are collected.

The different fractions are analyzed by paper chromatography, revealing the active compounds by bioautography of the chromatograms on plates of agar inoculated with *B. subtilis*. Fractions 5–7 contain libanomycin B; fractions 8–16 contain libanomycin A and B; fractions 17–24 contain libanomycin A; fractions 25-40 contain libanomycin A and traces of C; and fractions 41-45 contain libanomycin C.

Distilled water and petroleum ether are added to each group of fractions until the formation of two phases is obtained. The aqueous phase is thrice extracted with 1 volume of petroleum ether. The aqueous phase is concentrated under reduced pressure after addition of ethyl alcohol till dryness. The residue is taken up with ethyl alcohol, the solution is filtered, concentrated to half volume. Upon adding 10 volumes of anhydrous acetone, the antibiotics precipitate in the amorphous form. The precipitate is taken up by filtration, washed with anhydrous acetone and dried on $P_2O_5$ at 56° C under vacuum.

30 mg of libanomycin B, 120 mg of libanomycin A containing traces of B, 640 mg of libanomycin A, 150 mg of libanomycin A containing traces of C, 5 mg of libanomycin C are obtained.

EXAMPLE 5

50 l of inoculation medium described in Example 4 are placed in an 80 l stainless steel fermenter and sterilized for 30 minutes at 121° C. The temperature is taken up to 27° C and the fermenter is inoculated with 500 cc of a vegetative culture grown, in the same medium, in an inoculation flask as described in Example 4. The fermenter is aerated with 0.7 volumes of air per volume of the medium and shaken for a period of 25 hours. During this period a pH 6.7 is reached. The broth is used to inoculate an 80 l stainless steel fermenter. The fermentation medium is composed as follows:

| | |
|---|---|
| Starch | 5.0% |
| Glucose | 0.5% |
| Calcium carbonate | 0.5% |
| Soyabeans meal | 4.0% |
| Magnesium sulphate | 0.1% |
| Tap water to complete | | with 25 liters of the described vegetative culture and the whole is shaken at 210 r.p.m. and aerated with a flux of air of 0.65 volumes per volume of the medium per minute for 87 hours.

120 µg/cc of antibiotic are obtained.

450 l of broth are filtered on filter press with 3 percent of Supercel. The nycelium washed with water, but wet (86 kg), is twice extracted with 360 l of 90 percent aqueous methyl alcohol. The extract is concentrated under reduced pressure, at 40-45° C, to 100 liters. The concentrate is adjusted to pH 8.5 and is then extracted first with 70 l and then with 20 l of butyl alcohol. The combined extracts are washed with water and concentrated under reduced pressure to 8 liters. The precipitate is filtered, washed with acetone and dried. 180 g of 20 percent crude product, formed by libanomycin A, B and C, are obtained. The further concentration to 1 liter of the butanol extract and the following precipitation with 10 l of acetone result in obtaining an additional 208 g of 20 percent crude product, composed by a mixture of the three antibiotics.

The filtered broth and the aqueous washings of the mycelium (500 l) are combined and adjusted to pH 8.5. They are then extracted, two times, with 280 l of butyl alcohol. The extract is washed with water and concentrated under reduced pressure to 25 l, the inactive precipitate is filtered and the filtrate is concentrated again to 2 liters. By adding 10 volumes of acetone, a precipitate is formed, washed with acetone and dried. 75 g of 20 percent crude product containing libanomycin A, B and C are so obtained.

EXAMPLE 6

Operating as in Example 1, but using the microorganism Streptomyces libani n.sp. F.I. 2399, 100 µg/cc of antibiotic are obtained.

EXAMPLE 7

Operating as in Example 1, but using the microorganism Streptomyces libani n.sp. F.I. 2521, 80 µg/cc of antibiotic are obtained.

EXAMPLE 8

Operating as in Example 1, but employing the microorganism Streptomyces libani F.I. 2501, 60 µg/cc of antibiotic are obtained.

We claim:
1. A microbiologic process for preparing the antibiotic substance libanomycin which comprises cultivating a species of Streptomyces libani n.sp. selected from Streptomyces libani n.sp. I.P.V. 1945, Streptomyces libani n.sp. I.P.V. 1942, Streptomyces libani n.sp. I.P.V. 1943 and Streptomyces libani n.sp. I.P.V. 1944 under aerobic conditions in a liquid cultural medium containing a source of carbon of nitrogen and mineral salts, until a substantial antibiotic activity has been imparted to the medium separating and isolating the antibiotic complex libanomycin thus obtained from the medium.

2. The process of claim 1, wherein the microorganism Streptomyces libani n.sp. I.P.V. 1945 is cultivated.

3. The process of claim 1, wherein the microorganism Streptomyces libani n.sp. I.P.V. 1942 is cultivated.

4. The process of claim 1, wherein the microorganism Streptomyces libani n.sp. I.P.V. 1943 is cultivated.

5. The process of claim 1, wherein the microorganism Streptomyces libani n.sp. I.P.V. 1944 is cultivated.

6. An antibiotic substance libanomycin prepared by the process of claim 11.

* * * * *